United States Patent Office 3,544,295
Patented Dec. 1, 1970

3,544,295
PROCESS FOR INHIBITING NITRIFICATION OF AMMONIA NITROGEN IN SOILS AND SOIL-TREATING MATERIALS THEREFOR
Koichi Nakamigawa and Reijiro Takaoka, Yokohama, and Katsura Koyama, Tokyo, Japan, assignors to Nitto Chemical Industry Co., Ltd., Tokyo, Japan, a corporation of Japan
No Drawing. Filed Dec. 11, 1967, Ser. No. 689,337
Int. Cl. A01n 7/00
U.S. Cl. 71—1      8 Claims

ABSTRACT OF THE DISCLOSURE

A process for inhibiting the nitrification of ammonia nitrogen in growth media for plants by applying to said media 1-amidino-2-thiourea or salts thereof or mixtures thereof; and soil-treating materials containing 1-amidino-2-thiourea.

---

This invention relates to a process for inhibiting the nitrification of ammonia nitrogen in soils, and to soil-treating materials to be used therefor. More particularly, the invention pertains to a process for inhibiting the nitrification of ammonia nitrogen in growth media for plants by applying to said media 1-amidino-2-thiourea or salts thereof or mixtures thereof, and to soil-treating materials containing 1-amidino-2-thiourea.

It is well known that in a soil, ammonia nitrogen is converted into nitrate nitrogen by action of nitrous acid or nitric acid-producing microorganisms. That is, ammonia nitrogen formed by the decomposition of nitrogen-containing organic compounds in the soils or of animal and vegetable dregs, excrements, urea and the like natural or synthetic nitrogen-containing organic compounds, which are applied as fertilizers, or ammonia nitrogen derived from ammonium salts such as ammonium sulfate, ammonium chloride, ammonium phosphate and ammonium nitrate, which are used as fertilizers, is oxidized with bacteria in the soils to form nitrate nitrogen. It is also well known that nitrate nitrogen is lower in affinity for colloidal soils than ammonia nitrogen, and hence is susceptible to leaching and flowing out of nitrogen due to the eluting action of rainwater or irrigation water, or is decomposed with the reducing atmosphere in the soil and is volatilized as nitrogen oxide or nitrogen gas. These become great causes for the loss of nitrogen in the soil. On the other hand, ammonia nitrogen is well adsorbed on colloidal soils, is far more stable than nitrate nitrogen and is not readily lost from the soil. Therefore, to inhibit the nitrification action of soil to a suitable extent diminishes the loss of nitrogen necessary as a nutritive element for plants, and enhances the durability in fertilizing effect of nitrogenous fertilizers, with the result that there are brought about such effect as reduction in fertilization amounts or times of nitrogen fertilizers which is markedly desirable from the view points of nitrogen economy of growth media and of labor-saving.

Heretofore, various studies have been made in order to inhibit or control the nitrification of ammonia, and, as materials for inhibiting the nitrification, various compounds such as pyridine, pyrimidine and aniline derivatives have been proposed in addition to dicyandiamide, thiourea and the like.

Nitrification-inhibiting agents are not only required to be high in power of inhibiting the nitrification of ammonia and have no influence on the ammonification of nitrogen-containing organic compounds, but also should practically be difficulty flowed out from soils by means of water, below in volatilization loss and be less in detrimental effect on men, cattle and plants. Among the materials that have heretofore been proposed, those which satisfy all of these requirements are scarcely found.

In view of the above, the present inventors made various studies to find that 1-amidino-2-thiourea and salts thereof display marked effects and satisfy the above-mentioned requirements. The present invention has been attained on the basis of the above finding.

It is therefore an object of the present invention to provide a process for inhibiting the nitrification of ammonia nitrogen in a growth medium for plants by applying 1-amidino-2-thiourea or a salt thereof to said medium. Another object is to provide soil-treating materials containing 1-amidino-2-thiourea.

The characteristics of the present invention reside in that not only the present process displays prominent nitrification-inhibiting effects and has no influence on the ammonification of nitrogen-containing organic compounds, but also the 1-amidino-2-thiourea and salts thereof employed in the present process are nitrification-inhibiting agents which have high soil adsorptive power and are high in the resistance against leaching as compared with other nitrification-inhibiting agents. Of course, the vapor losses of the 1-amidino-2-thiourea and salts thereof are so small as to be negligible and the detrimental effects thereof on men, cattle and plants are so low as to bring about no practical troubles. Further, there is such advantage that said materials are inexpensive as compared with pyridine, pyrimidine or aniline derivatives.

The 1-amidino-2-thiourea employed in the present invention is a compound represented by the structural formula

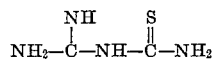

as the salts thereof, there are used, in general, hydrochloride, nitrate, sulfate, phosphate, formate, acetate, oxalate and benzoate, though they are not particularly limited.

In practicing the present process, 1-amidino-2-thiourea or salts thereof are desirably applied, as uniformly as possible, to growth media to be inhibited from nitrification. Accordingly, it is desirable that the materials be formulated into forms convenient for application by adoption of formulating procedures employed in the case of general soil-treating agents. 1-amidino-2-thiourea and salts thereof are normally solids and may be formulated into dusts with or without the addition of solid extenders and other assistants. Further, they may be formulated into any granular preparations through a granulating step, solutions by addition of water or other solvents, and emulsifiable concentrates by dissolving them in hydrophobic solvents and adding emulsifiers to the solutions. Alternatively, they may be applied to soils in the form of mixtures with other soil-treating agents, such as soil-treating agricultural chemicals or natural or synthetic fertilizers. Generally, it is most preferable to apply them to growth media in the forms of nitrification-inhibiting agent-containing fertilizers prepared by blanding them with fertilizers. In some cases, however, 1-amidino-2-thiourea or salts thereof may be directly applied to growth media either independently or in the form of the above-mentioned dusts, granular preparations or liquid preparations.

The most effective application amount of 1-amidino-2-thiourea or a salt thereof employed in the present invention varies depending on the desired extent or period of nitrification inhibition, the kind or water content of soil, and temperature and the like weather conditions. Generally, however, the material is used at a concentration within the range of from 0.2 to 200 parts, preferably from 1 to 100 parts, by weight as 1-amidino-2-thiourea per million parts by weight of the soil of a growth medium. Particularly, in applying to the soil of a growing plant, the material is required to be used in an amount capable of inhibiting nitrification without giving any influence practically to the plant growth. In such operation, it should be applied in an amount of 100 or less parts by weight as 1-amidino-2-thiourea per million parts by weight of the soil. Further, it is desirable that the nitrification-inhibiting agent of the present invention be made present in the soil of a growth medium in an amount of at least 0.05% by weight, as 1-amidino-2-thiourea, based on the weight of ammonia nitrogen in said soil.

In practice, the present nitrification-inhibiting agent is applied to a growth medium prior to sowing or transplanting of a desired crop, is applied directly to the medium of a crop under growth, or is applied to the medium subsequent to the harvest of a crop, whereby the quick loss of ammonia nitrogen can be prevented and the amount of ammonia nitrogen formed by the conversion of organic nitrogen compounds can be increased.

The present nitrification-inhibiting agent, which is used to tract the soil of a growth medium, is added, during the course of practice of the present process, to a liquid or finally divided solid composition. In such practice, 1-amino-2-thiourea or a salt thereof may be modified by addition of one or more additives or soil-treating assistants selected from the group consisting of liquid carriers such as water, organic solvents and the like, surface active agents, finely-divided inert solids and nitrogen-containing fertilizers. The composition thus increased in amount is further diluted with an inert carrier, in accordance with the content of 1-amidino-2-thiourea, whereby a final soil-treating composition can be prepared. The concentration of 1-amidino-2-thiourea in the composition employed for the treatment of a growth medium is not particularly limited but is variable within a markedly wide range. That is, the concentration can be optionally varied depending on whether the composition is a composition directly applicable to soils, a concentrated composition or a solid or liquid composition.

The liquid composition containing 1-amidino-2-thiourea or a salt thereof is obtained by dissolving or dispersing 1-amidino-2-thiourea or a salt thereof in one or more liquid carriers selected from the group consisting of water and organic solvents, with or without the aid of a suitable surface active agent or emulsifier. Preferable as such solvents include water, aliphatic lower alcohols such as methanol, ethanol, isopropanol and isobutanol, ketones such as acetone, methylethylketone and diisobutylketone, ethers such as ethyl ether and isopropyl ether, and organic solvents such as benzene, toluene, dimethylformamide, dimethylacetamide, dimethylsulfoxide, dioxane, methyl cellosolve and petroleum fractions. In application, the liquid composition is further diluted with a suitable amount of water and is used in the form of an aqueous solution, suspension or emulsion.

The solid composition containing 1-amidino-2-thiourea or a salt thereof is prepared by dispersing 1-amidino-2-thiourea or a salt thereof in a finely divided inert solid carrier such as talc, chalk, gypsum, vermiculite or bentonite, in fuller's earth or the like clay, or in a solid-dispersing agent or solid fertilizer composition. In the preparation of such composition, the carrier is mechanically pulverized and mixed together with the compound of the present invention and may be used as such depending on the proportions of the components, or may further be diluted, with a solid dispersing agent to obtain a required treating composition. Alternatively, the concentrated composition may further be granulated, or it may be independently dispersed in water to prepare an aqueous soil-treating composition. According to the most preferable embodiment of the present invention, the soil-treating composition is prepared by dispersing the compound of the present invention in such a fertilizer containing ammonia nitrogen fertilizer and/or organic nitrogen fertilizer. The thus prepared fertilizer composition is used as such or is further diluted with a nitrogen fertilizer or inert solid carrier and is used as a composition containing a required amount of the nitrification-inhibiting agent. Alternatively, an aqueous solution of the nitrification-inhibiting agent-containing fertilizer composition may be prepared and may be applied to a growth medium.

In a fertilizer composition comprising a fertilizer containing organic nitrogen and/or ammonia nitrogen, the present nitrification-inhibiting agent is desirably made present in an amount at least 0.1% by weight as 1-amidino-2-thiourea based on the total nitrogen present in the fertilizer.

The nitrification-preventing agent is a material which inhibits the conversion of ammonia nitrogen in a fertilizer into nitrate nitrogen. However, not only such organic nitrogen as urea but also such organic nitrogen as animal and vegetable dregs are readily converted in the soils into ammonia nitrogen. Therefore, the amount of nitrification-inhibiting agent should naturally be decided taking into consideration not only the amount of ammonia nitrogen but also that of organic nitrogen in a fertilizer.

In the process carried out according to the present invention, the present nitrification-inhibiting agent or a composition containing the same is penetrated into a soil according to a convenient procedure. For example, the modified or non-modified composition is mechanically mixed with a soil, is applied onto the surface of soil and is then penetrated into the soil to a desired depth. Alternatively, the composition is charged into a soil together with a liquid carrier by pouring, spraying or irrigating procedure. A suitable process is to apply to a soil the present nitrification-inhibiting agent substantially simultaneously with a nitrogen-containing fertilizer by adoption of any of said procedures.

The following examples illustrate the modes of practice of the present invention and the effects thereof.

EXAMPLE 1

In order to investigate the influence of 1-amidino-2-thiourea and salts thereof on ammonification and nitrification in a soil, 1-amidino-2-thiourea and salts thereof in amounts of 0.3 mg., 1.5 mg. and 3.0 mg. were individually incorporated into 100 g. of a volcano ash soil. Each soil was further charged with 30 mg., as nitrogen, of urea, and was adjusted to pH 6.0–6.5, and the water content of the soil was maintained at 60% of the maximum content. Subsequently, the soil was incubated at 30° C. for 28 days, and the amounts of ammonia nitrogen and nitrate nitrogen were measured every 7 days. For comparison, the same measurement was effected, with respect to the cases where urea was used independently and thiourea was added in amounts of 0.3 mg., 1.5 mg. and 3.0 mg. The results were as shown in Table 1.

TABLE 1

| Test area | Amount of additive, mg. | 7 NH₃—N (mg.) | 7 NO₃—N (mg.) | 7 Nitrification ratio, percent | 14 NH₃—N (mg.) | 14 NO₃—N (mg.) | 14 Nitrification ratio, percent | 21 NH₃—N (mg.) | 21 NO₃—N (mg.) | 21 Nitrification ratio, percent | 28 NH₃—N (mg.) | 28 NO₃—N (mg.) | 28 Nitrification ratio, percent |
|---|---|---|---|---|---|---|---|---|---|---|---|---|---|
| Urea | | 26.6 | 3.1 | 10.4 | 13.0 | 16.9 | 56.3 | 3.1 | 26.8 | 90.0 | 0.3 | 29.5 | 99.0 |
| 1-amidino-2-thiourea | 0.3 | 28.4 | 1.7 | 5.7 | 25.8 | 4.0 | 13.4 | 19.6 | 10.4 | 34.7 | 11.3 | 19.0 | 64.9 |
| Do | 1.5 | 29.7 | 0.1 | 0.3 | 29.3 | 0.5 | 1.7 | 29.6 | 1.5 | 5.0 | 23.1 | 6.9 | 23.0 |
| Do | 3.0 | 30.1 | −0.3 | 0. | 30.1 | −0.1 | 0. | 29.8 | −0.1 | 0. | 29.3 | 0.5 | 1.7 |
| 1-amidino-2-thiourea posphate | 1.5 | 29.1 | 1.2 | 4.0 | 28.8 | 0.9 | 3.0 | 28.0 | 1.9 | 6.4 | 20.9 | 9.2 | 30.6 |
| 1-amidino-2-thiourea sulfate | 1.5 | 29.0 | 0.8 | 2.7 | 28.7 | 0.9 | 3.0 | 28.3 | 1.7 | 5.7 | 22.0 | 7.7 | 25.9 |
| 1-amidino-2-thiourea formate | 1.5 | 29.8 | −0.1 | 0. | 29.3 | 0.6 | 2.0 | 28.3 | 1.5 | 5.0 | 23.1 | 6.7 | 22.5 |
| Thiourea | 0.3 | 28.5 | 1.7 | 5.6 | 25.4 | 4.8 | 15.9 | 10.0 | 19.3 | 65.9 | 2.6 | 27.0 | 91.2 |
| Do | 1.5 | 28.5 | 1.4 | 4.7 | 26.8 | 3.0 | 10.1 | 19.2 | 10.6 | 35.6 | 9.5 | 20.0 | 67.1 |
| Do | 3.0 | 29.3 | 0.5 | 1.7 | 28.8 | 0.6 | 2.0 | 28.7 | 1.2 | 4.0 | 23.0 | 6.9 | 23.1 |

In the table, the nitrification ratio was calculated according to the following equation:

$$\text{Nitrification ratio, percent} = \frac{\text{Amount of total nitrate nitrogen} - \text{Amount of nitrate nitrogen according to blank test}}{\text{Amount of total nitrogen added}} \times 100$$

From Table 1, it is understood that 1-amidino-2-thiourea and salts thereof are marked in nitrification-inhibiting effect and are far more excellent in said effect than thiourea. Further, it is clear that 1-amidino-2-thiourea and salts thereof do not injure the ammonification of urea.

EXAMPLE 2

In order to investigate the effects, when applied to a soil, of 1-amidino-2-thiourea-containing fertilizers which are embodiments of the present invention, compound fertilizers containing urea incorporated with 1-amidino-2-thiourea were prepared and were individually applied as base fertilizers for the direct sowing cultivation of aquatic rice in a dry paddy field to examine the fertilizability thereof. (In the direct sowing cultivation of aquation rice in a well-drained paddy field, the nitrification-inhibiting egect of a base fertilizer has great influence on the growth of rice.)

In the first place, 11 parts of 1-amidino-2-thiourea powder was mixed with 200 parts of powdery urea, and the mixture was further charged with 300 parts of potassium chloride. The mixture was added to a slurry obtained by reacting 110 parts of ammonia with an acid mixture comprising 224 parts of phosphoric acid liquid (calculated for 100% phosphoric acid) and 70 parts of sulfuric acid (calculated for 100% sulfuric acid). The resulting mixture was granulated, was treated with 30 parts of a coating agent and was dried to prepare a compound fertilizer containing 1.1% of 1-amidino-2-thiourea (the amount of 1-amino-2-thiourea nitrogen based on the total nitrogen of the fertilizer composition was about 3%. In the same manner as above, a compound fertilizer urea containing 1-amidino-2-thiourea in 2 times the amount of that contained in the above-mentioned fertilizer was prepared. These compound fertilizers containing 1-amidino-2-thiourea and a compound fertilizer containing no 1-amidino-2-thiourea were individually used for the direct sowing cultivation of aquatic rice in a dry paddy field. Analytical values of the 3 test fertilizers were as shown in Table 2.

TABLE 2

| | TN (percent) | SP (percent) | WK (percent) | ASU—N/TN (percent) | ASU/fertilizer (percent) |
|---|---|---|---|---|---|
| Compound: Fertilizer | 17.35 | 17.50 | 17.48 | 0 | 0 |
| Fertilizer containing smaller amount of ASU | 17.30 | 17.48 | 17.48 | 3.12 | 1.15 |
| Fertilizer containing larger amount of ASU | 17.40 | 17.52 | 17.45 | 6.20 | 2.30 |

NOTE.—"ASU" represents 1-amidino-2-thiourea.

The test was effected in the following manner:

Seeds of Norin-25 rice were scatteringly sowed directly in a dry paddy field prepared for sowing. Prior to sowing, each test fertilizer was applied as a base fertilizer to the field so that the amount of nitrogen (N) became 10 kg. per 10 ares the amount of phosphoric acid ($P_2O_5$) and potassium ($K_2O$) also became about 10 kg./10 ares. As an area to be separately fertilized, there was prepared, using urea, ammonium phosphate, potassium chloride and ammonium sulfate, an area to which had been applied, per 10 ares of the soil, 2.5 kg. of nitrogen (N), 10 kg. of phosphoric acid ($P_2O_5$) and 10 kg. of potassium ($K_2O$) as base fertilizers, 5 kg. of nitrogen (N) as an additional fertilizer immediately after charging of water, and 2.5 kg. of nitrogen as an ear fertilizer. After the sowing, the field was maintained in a drained state for one month. Subsequently, the field was charged with water and was then managed according to an ordinary procedure.

Only in a nitrogen-free area, the rice came into ears one day earlier than in other areas. However, as to the stage at which the rice was all in ears, no difference was seen between the individual areas, and the degree of ripeness was normal in every area except in the nitrogen-free area. In every area, harvest was effected simultaneously, and the yields of hulled rice were as shown in Table 4.

TABLE 3

|  | Nitrogen-free area | Separately fertilized area | Area of compound fertilizer | Area of compound fertilizer containing smaller amount of ASU | Area of compound fertilizer containing larger amount of ASU |
| --- | --- | --- | --- | --- | --- |
| Yield of hulled rice (kg./10 acres) | 266 | 500 | 333 | 493 | 530 |
| Index | 80 | 150 | 100 | 148 | 159 |

From Table 3, it is clear that the compound fertilizers containing urea incorporated with 1-amidino-2-thiourea are far higher in fertilizability than the compound fertilizer containing urea, and can give yields well comparable to the case where a 3-time separate fertilization process is adopted.

EXAMPLE 3

0.5 part of 1-amidino-2-thiourea was added to and dissolved in 100 parts of a liquid compound fertilizer (TN:8%, WP:8%; WK:5%) to obtain 100.5 parts of a nitrification-inhibiting agent-containing liquid fertilizer. 5 kg. of the thus obtained fertilizer was diluted with water and was applied to 1 are of a soil. The effects of the fertilizer were as shown in Table 4.

TABLE 4

| Test area | Nitrification ratios, (percent) | |
| --- | --- | --- |
|  | 14th day after treatment | 28th day after treatment |
| Area of 1-amidino-2-thiourea hydrochloride | 2.8 | 30.2 |
| Control area of nonincorporated liquid fertilizer | 91.8 | 100.0 |

EXAMPLE 4

To 30 parts of 1-amidino-2-thiourea phosphate was added 70 parts of a diatom earth-kaolin mixture as an inert solid carrier. The mixture was pulverized to obtain a dust (A) as a nitrification-inhibiting agent-containing solid composition. The concentration of 1-amidino-2-thiourea in the dust (A) was 16.5%.

In the next place, to 50 parts of 1-amidino-2-thiourea were added 45 parts of a diatom earth-kaolin mixture as an inert solid carrier, 3 parts of sodium alkylbenzenesulfonate and 2 parts of sodium dinaphthylmethane disulfonate. The mixture was pulverized to obtain a wettable dust (B).

After uniformly applying 10 g. of urea in terms of nitrogen per square meter of a test soil surface, there were prepared an area uniformly sprinkled with 3 g./m.$^2$ of the dust (A), an area uniformly sprayed with 100 ml./m.$^2$ of a suspension of 1 g. of the wettable dust (B) in 100 ml. of water, and a control area which had not been subjected to 1-amidino-2-thiourea treatment. The soil was then plowed to a depth of 10 cm. from the surface, and was uniformly mixed. After 30 days, the soil up to a layer of 10 cm. from the surface was recovered, and ammonia nitrogen and nitrate nitrogen in the soil were analyzed. The results were as shown in Table 5, and thus the ammonia nitrogen contents of the 1-amidino-2-thiourea-treated areas were obviously high. During the test period, the test areas were provided with roofs of vinyl chloride sheets to avoid influence due to rain.

TABLE 5

|  | NH$_3$N (mg./100 g. soil) | NO$_3$—N (mg./100 g. soil) |
| --- | --- | --- |
| (A) treated area | 12.3 | 2.3 |
| (B) treated area | 11.8 | 2.2 |
| Nontreated area | 0.9 | 13.7 |

EXAMPLE 5

1 part of 1-amidino-2-thiourea was dissolved in 2 parts of dimethylformamide to obtain a nitrification-inhibiting agent-containing liquid preparation. 3 parts of this liquid preparation was dissolved in 197 parts of water, and the solution was uniformly sprayed onto the surface of a soil by means of a sprayer in a proportion of 100 g./m.$^2$. Thereafter, the soil was plowed to a depth of 10 cm. from the surface and was uniformly mixed. As a control, there was prepared a test area which had been subjected only to fertilization with urea in the same amount as above and to plowing. After 30 days, the soil up to a layer of 10 cm. from the surface was recovered, and ammonia nitrogen and nitrate nitrogen in the soil were analyzed. The results were as shown in Table 6 and thus the ammonia nitrogen content of the 1-amidino-2-thiourea-treated area was obviously high. During the test period, there was a rainfall of 65 mm.

TABLE 6

|  | NH$_3$—N (mg./100 g. soil) | NO$_3$—N (mg./100 g. soil) |
| --- | --- | --- |
| 1-amidino-2-thiourea-treated area | 13.6 | 1.6 |
| Nontreated area | 1.1 | 4.1 |

We claim:
1. A process for inhibiting the nitrification of ammonium nitrogen in soil which comprises treating the soil in a plant growing area with a thiourea compound selected from the group consisting of 1-amidino-2-thiourea and salts thereof, by incorporating into soil an amount of said compound equivalent to at least 0.2 part by weight of 1-amidino-2-thiourea per million parts by weight of soil.

2. A process according to claim 1 wherein the thiourea compound is incorporated into soil in an amount equivalent to from 0.2 to 200 parts by weight of 1-amidino-2-thiourea per million parts by weight of soil.

3. A process for inhibiting the nitrification of ammonium nitrogen in soil which comprises treating the soil in a plant growing area with a composition comprising a thiourea compound in intimate admixture with a soil treating adjuvant, the thiourea compound being selected from the group consisting of 1-amidino-2-thiourea and salts thereof, by incorporating into soil an amount of said compound equivalent to at least 0.2 part by weight of 1-amidino-2-thiourea per million parts by weight of soil.

4. A process according to claim 3 wherein the adjuvant is a reduced nitrogen fertilizer composition selected from the group consisting of ammonia nitrogen and urea.

5. In the fertilization of soil with a reduced nitrogen fertilizer, the step which comprises treating the soil in a plant growing area substantially simultaneously with the reduced nitrogen fertilizer, a thiourea compound selected from the group consisting of 1-amidino-2-thiourea and salts thereof, by incorporating into soil an amount of said compound equivalent to at least 0.2 part by weight of 1-amidino-2-thiourea per million parts by weight of soil to inhibit the nitrification of ammonium nitrogen in the soil, said reduced nitrogen fertilizer being selected from the group consisting of ammonia, ammonium salts and urea.

6. In the fertilization according to claim 5 wherein the thiourea compound is incorporated into soil in an amount equivalent to from 0.2 to 200 parts by weight of 1-amidino-2-thiourea per million parts by weight of soil.

7. A fertilizer composition comprising a major amount of a reduced nitrogen fertilizer as source of ammonium ions and a thiourea compound selected from the group consisting of 1-amidino-2-thiourea and salts thereof, said compound being present in a concentration equivalent to at least 0.1% of 1-amidino-2-thiourea by weight based on the weight of the total nitrogen present in the fertilizer, and said reduced nitrogen fertilizer being selected from the group consisting of ammonia nitrogen and urea.

8. A fertilizer composition according to claim 7 where the thiourea compound is present in a concentration of from 0.1 to 30% by weight as 1-amidino-2-thiourea based on the weight of the total nitrogen present in the fertilizer.

References Cited

UNITED STATES PATENTS

| | | | |
|---|---|---|---|
| 2,945,322 | 7/1960 | Gaeth et al. | 71—1 X |
| 3,009,804 | 11/1961 | Goring | 71—1 |
| 3,009,805 | 11/1961 | Goring | 71—1 |
| 3,050,382 | 8/1962 | Goring | 71—1 |
| 3,284,188 | 11/1966 | Amagasa et al. | 71—1 X |

J. L. DE CESARE, Primary Examiner